(12) United States Patent
Dickson

(10) Patent No.: US 6,264,522 B1
(45) Date of Patent: Jul. 24, 2001

(54) CONSTRUCTION SYSTEM

(76) Inventor: Marilyn M. Dickson, 4931 S. Bellaire La., Verdale, WA (US) 99037

( * ) Notice: Subject to any disclaimer, the term of this patent is extended or adjusted under 35 U.S.C. 154(b) by 0 days.

(21) Appl. No.: 09/455,986

(22) Filed: Dec. 7, 1999

(51) Int. Cl.$^7$ ................................................. A63H 33/08
(52) U.S. Cl. ........................ 446/120; 446/102; 446/124; 446/126
(58) Field of Search .................................. 446/102, 120, 446/124, 126

(56) References Cited

U.S. PATENT DOCUMENTS

| | | | |
|---|---|---|---|
| 1,113,371 | * 10/1914 | Pajeau | 446/126 |
| 2,962,820 | * 12/1960 | Petersen | 446/102 X |
| 3,286,391 | * 11/1966 | Mengeringhausen | 446/126 X |
| 3,392,480 | 7/1968 | Stubbmann . | |
| 3,458,949 | * 8/1969 | Young | 446/124 |
| 3,605,322 | 9/1971 | Matsubayashi et al. . | |
| 3,654,726 | * 4/1972 | Witte | 446/120 X |
| 4,503,649 | 3/1985 | Sciortino . | |
| 4,617,001 | 10/1986 | Parein . | |
| 4,691,828 | 9/1987 | Slusarczyk et al. . | |
| 4,787,191 | * 11/1988 | Shima | 446/126 X |
| 4,789,369 | 12/1988 | Lyman . | |
| 4,826,464 | 5/1989 | Bertrand . | |
| 4,884,920 | 12/1989 | Perazzi . | |
| 4,965,979 | 10/1990 | Larrivee et al. . | |
| 5,066,353 | 11/1991 | Bourdo . | |
| 5,137,485 | 8/1992 | Penner . | |
| 5,154,032 | 10/1992 | Ritter . | |
| 5,172,534 | 12/1992 | Milner et al. . | |
| 5,178,492 | 1/1993 | Meheen . | |
| 5,199,919 | 4/1993 | Glickman . | |
| 5,209,693 | 5/1993 | Lyman . | |
| 5,337,527 | 8/1994 | Wagenaar . | |
| 5,421,135 | 6/1995 | Stevens et al. . | |
| 5,474,025 | * 12/1995 | Lee | 446/126 X |
| 5,503,497 | 4/1996 | Dudley et al. . | |
| 5,548,938 | 8/1996 | Scheiwiller . | |
| 5,584,601 | 12/1996 | Hähn et al. . | |
| 5,645,463 | 7/1997 | Olsen . | |
| 5,651,642 | 7/1997 | Kelley, Jr. et al. . | |
| 5,733,168 | 3/1998 | Poulsen et al. . | |
| 5,769,681 | 6/1998 | Greenwood, Sr. et al. . | |
| 5,897,417 | * 4/1999 | Grey | 446/102 X |

* cited by examiner

Primary Examiner—John A. Ricci
(74) Attorney, Agent, or Firm—Thorpe North & Western LLP

(57) ABSTRACT

A construction system includes one or more body members each having one or more apertures extending through a body wall to a cavity forming a socket. Each body member further has one or more balls spaced-apart from the body and attached to the body by an arm. The body wall and/or ball is formed of a flexible and resilient material, and the ball is sized slightly larger than the aperture to connect two body members together by inserting the ball of one member through the aperture of another. The system may include rod members having opposite ends and spherical-shaped balls formed on each end; disk members having an annular groove and open in a radially-facing direction to receive balls; a base member; and/or decorative members.

38 Claims, 10 Drawing Sheets

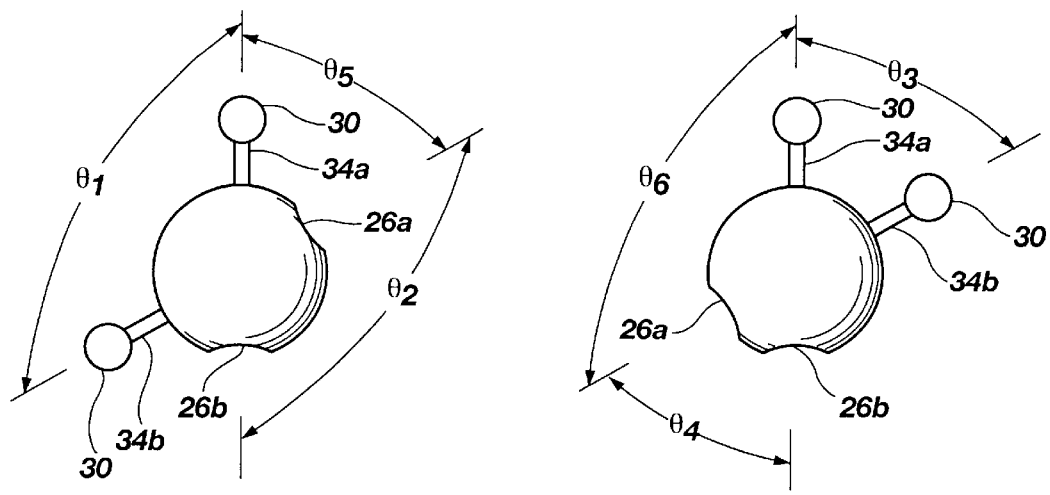
*Fig. 10a*     *Fig. 10b*
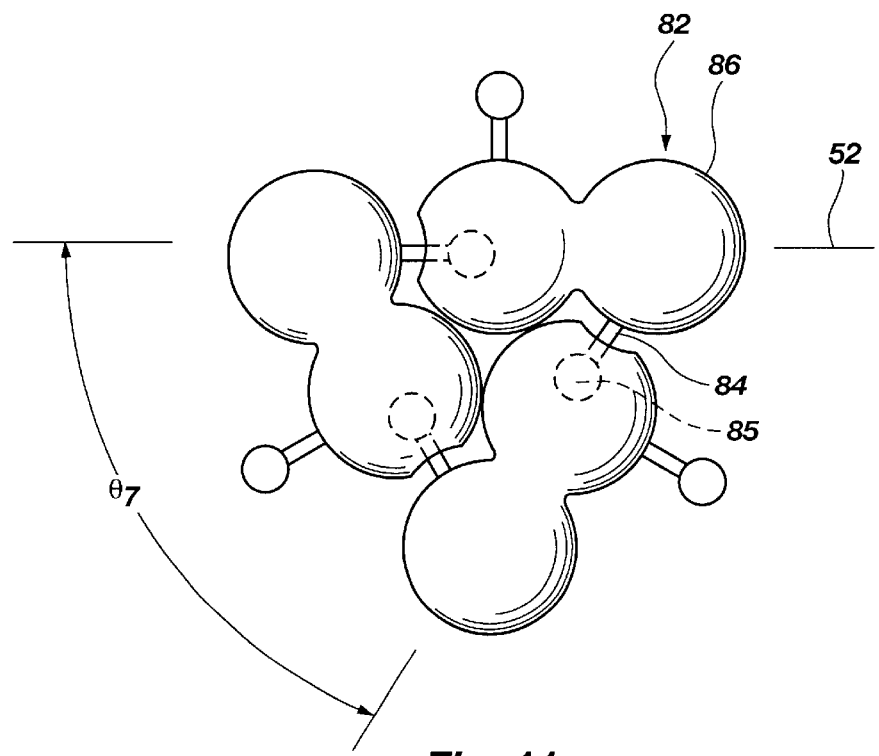
*Fig. 11*

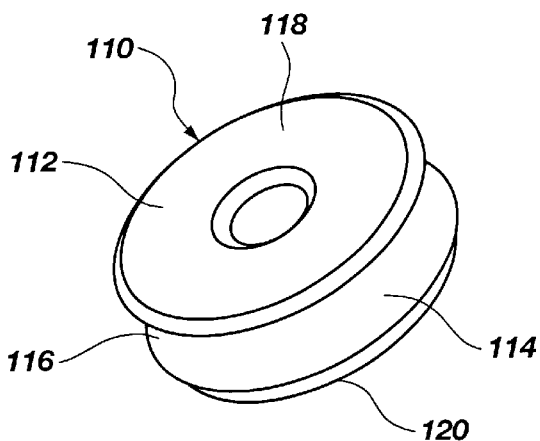
Fig. 14
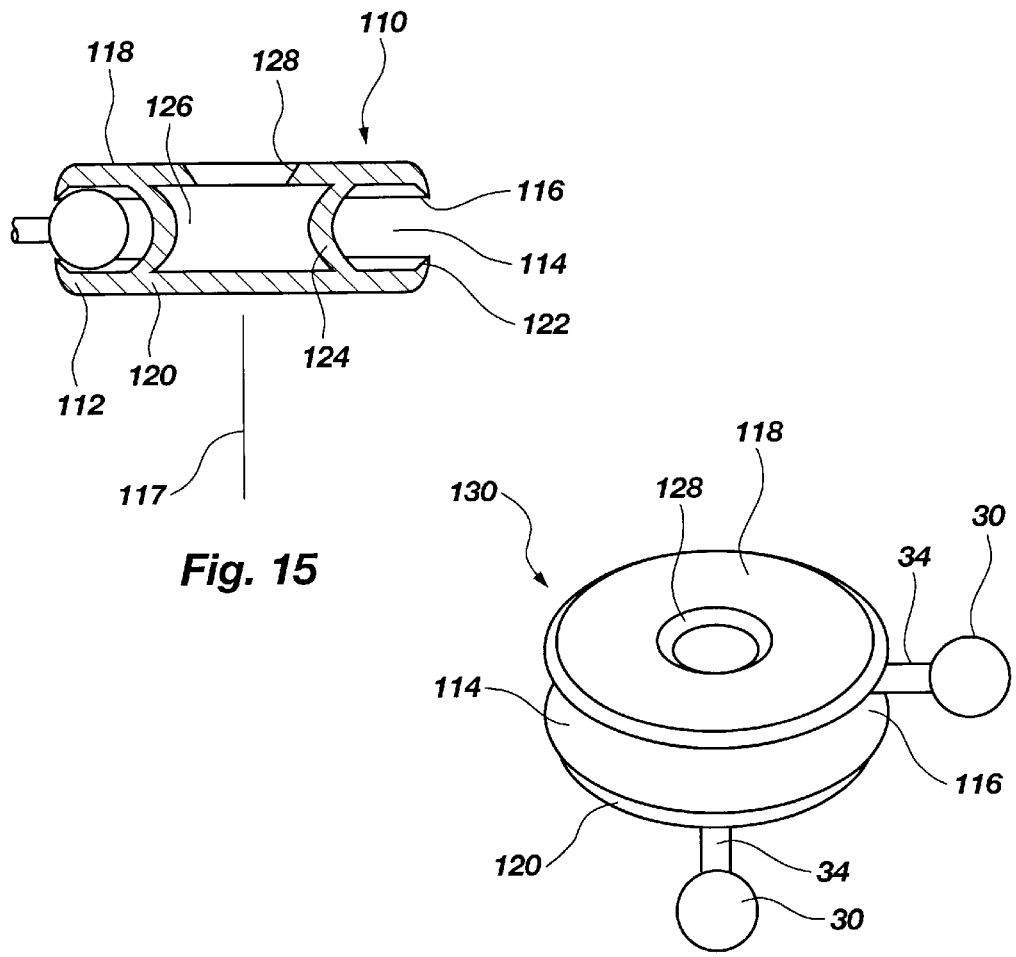
Fig. 15
Fig. 16

CONSTRUCTION SYSTEM

BACKGROUND OF THE INVENTION

1. The Field of the Invention

The present invention relates generally to a construction system, such as a toy building block system for recreation and creative expression, and/or making costume jewelry and craft items; a teaching aid for demonstrating mathematical concepts and inter-relationships, for experimenting with principles of structural engineering, for display architectural design, and/or for showing the structure of chemical bonds; and a tool for developing spatial and linear reasoning skills. More particularly, the present invention relates to a construction system with members that dynamically couple and pivot for building dynamic constructions.

2. The Background Art

Many different types of toy building systems have been developed. Most of these systems, however, are limited to rigid constructions, or have limited movement. For example, most blocks allow two separate blocks to be physically connected using an interference fit between a protrusion of one block and an indentation of the other. Most blocks accomplish the connection in a stacking relationship, while other types have been developed which permit other relationships. Most often, the connections between the blocks are rigid, or the two connected blocks do not move with respect to one another. Some systems provide a pivotal coupling which allows two blocks to be pivotally coupled together, and pivot with respect to one another, but typically only in one plane.

Such toy building block systems are typically directed towards and appeal to boys. These systems incorporate male themes, and utilize rectangular members, which are believed to have more appeal to boys. Because these building systems are a good tool for developing spatial reasoning, it is believed that the lack of appeal of typical building systems to girls explains in part why girls typically score lower on spatial-reasoning aptitude tests.

In addition, such toy building block systems are typically configured only for recreational purposes, and are ill suited for other uses. For example, such systems rarely are useful for explaining mathematical principles, demonstrating engineering principles, architectural design, or chemical bonds. Furthermore such systems are typically ill suited for artistic creative expression in the areas of craft items, custom jewelry, and the like.

It is generally considered that the learning and teaching process is facilitated by visualization, or the ability of the teacher to show and demonstrate what is being taught, and the ability of the student to perceive. Furthermore, it is generally considered that the learning process is facilitated by hands-on experience. Students seem more interested in, and better able to understand, matters which they can visualize and touch. Therefore, there is a continuing desire to develop new visual aids and hands-on experiences to aid in teaching.

Mathematics is one example of a field which may benefit from the use of visual, hands-on learning. Many mathematical functions, principles and relationships may have visual representations, or may be capable of physical demonstration. For example, geometric shapes and trigonometric functions can be physically constructed. In addition, many mathematical concepts are inter-related, but such inter-relationships may be difficult to comprehend. For example, trigonometric functions can be represented both on a unit circle and a Cartesian or rectangular coordinate system, although the relationship between the two may be elusive.

It is desirable to provide a system which would allow students to physically construct various mathematical concepts to enhance the student's understanding of those concepts. In addition, it is desirable to provide such a system which would allow students to manipulate the physical constructions to enhance understanding of the relationships between concepts.

Therefore, it would be advantageous to develop a construction system capable of forming dynamic connections. It would also be advantageous to develop such a construction system capable of forming dynamic constructions which are easily manipulated. It would also be advantageous to develop a construction system that would appeal to both boys and girls. It would also be advantageous to develop such a construction system capable of being utilized to demonstrate various concepts, such as mathematics, and capable of being utilized to demonstrate the inter-relationships between various concepts. It would also be advantageous to develop a construction system capable of demonstrating engineering principles, architectural design, or chemical bonds. It would also be advantageous to develop a construction system capable of encouraging artistic creative expression.

OBJECTS AND SUMMARY OF THE INVENTION

It is therefore an object of the present invention to provide a construction system with dynamic connections.

It is another object of the present invention to provide such a construction system for forming dynamic constructions.

It is another object of the present invention to provide such a construction system which is appealing to both boys and girls.

It is another object of the present invention to provide a construction system for furthering the understanding of various concepts, such as mathematics, engineering, architecture, and chemistry.

It is yet another object of the present invention to provide such a construction system for hands on experimentation.

It is yet another object of the present invention to provide such a construction system for furthering creative artistic expression.

The above objects and others not specifically recited are realized in a specific illustrative embodiment of a construction system with a plurality of blocks or members that dynamically couple together to form dynamic constructions which may be manipulated between different physical forms. Thus, the system of the present invention advantageously may be used to physically demonstrate certain concepts, such as mathematical and engineering principles, architectural design, and chemical bonds, and to physically demonstrate the relationship between two different but related concepts. In addition, the system of the present invention advantageously may be used to encourage artistic creative expression, and develop spatial and linear reasoning skill in both boys and girls.

In accordance with one aspect of the present invention, the system includes a plurality of body members each having a body with a body wall, and at least one cavity. The body members may include several different body members with different configurations. A first body member may have a plurality of apertures extending through the body wall to the cavity forming a plurality of sockets, and at least one spherical-shaped ball spaced-apart from the body wall and attached to the body wall by an arm coupled to and extending between the ball and the body wall. A second body member may have a plurality of spherical-shaped balls spaced-apart from the body wall and attached to the body wall by a plurality of arms, and at least one aperture forming at least one socket. Thus, the body members are capable of forming multiple connections, from multiple different directions.

The body members advantageously have different shapes and sizes to facilitate the construction of various different constructions. For example, the body members may be formed of a plurality of distinct segments. For example, the body members may be elongated, or have a length greater than a width or thickness thereof. Thus, the body members may be formed of a plurality of segments connected in a linear configuration. As another example, the body members may be triangular, or have three distinct segments with each segment being directly attached to the other two. Of course other configurations are possible.

The body wall and/or balls are formed of a flexible and resilient material. In addition, the balls are sized slightly larger than the apertures. Thus, a ball of a first body member may be inserted through an aperture of a second body member under an externally applied force, but the ball is held within the cavity by interference between the ball and the aperture. Therefore, first and second body members may be dynamically coupled together with the arm extending through the aperture.

In accordance with another aspect of the present invention, the apertures may have frusto-conical, inwardly tapering shapes so that the wall surrounding the aperture has a reduced cross section. Thus, insertion of the balls through the apertures is facilitated. The walls surrounding the apertures may have a spherical shape curving away from the aperture. Similarly, the walls surrounding the arms may have a spherical shape curving away from the arms. Thus, connected body members may pivot a greater distance.

In accordance with another aspect of the present invention, the system may include a plurality of disk members each having a disk-shaped body with disk walls which define a substantially annular groove formed around a perimeter of the disk-shaped body. The groove has an opening facing in a radial direction and sized slightly smaller than the balls. Thus, the balls may be inserted through the opening of the disk member under an externally applied force, but are held within the groove by interference between the ball and the aperture.

The various different blocks or members may be combined to form various different constructions. In addition, because the blocks or members are provided with pivotal connections, the blocks or members may be manipulated between different positions, allowing the constructions to be manipulated between different physical forms.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIGS. 10a and 10b are end views of alternative embodiments of body members of the construction system of the present invention;

FIG. 11 is a top view of a construction formed by alternative embodiments of body members of the construction system of the present invention;

FIG. 14 is a perspective view of a preferred embodiment of a disk member of the construction system of the present invention;

FIG. 15 is a cross-sectional side view of the preferred embodiment of the disk member of the construction system of the present invention;

FIG. 16 is a perspective view of an alternative embodiment of a disk member of the construction system of the present invention;

DETAILED DESCRIPTION

Figure 1:
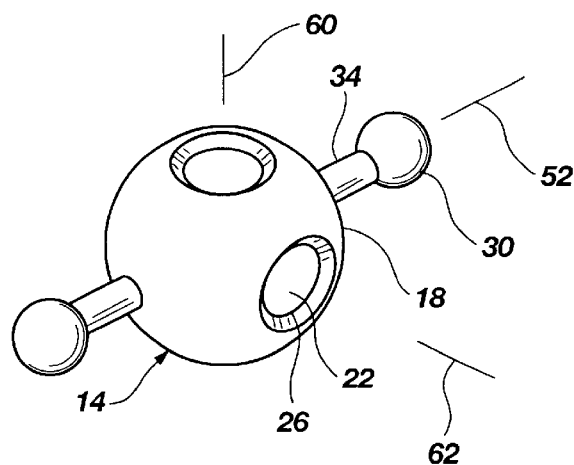
FIG. 1 is a perspective view of a preferred embodiment of a body member of a construction system in accordance with the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

A construction system in accordance with the present invention includes a plurality of blocks or members that dynamically couple together to form dynamic constructions which may be manipulated between different physical forms. Thus, the construction system of the present invention advantageously may be used to physically demonstrate certain concepts, such as mathematical and engineering principles, architectural design, and chemical bonds, and to physically demonstrate the relationship between two different but related concepts. In addition, the system of the present invention advantageously may be used to encourage artistic creative expression, and develop spatial and linear reasoning skills in both boys and girls. Mathematics is one example of a field which may benefit from use of such a construction system for demonstrating mathematical functions, concepts and relationships, and for providing hands-on experimentation. For example, the construction system may be used to form a construction which is a physical representation of a mathematical concept, such as geometric forms or trigonometric functions.

In accordance with one aspect of the present invention, the construction system provides a plurality of blocks or members which advantageously may be dynamically coupled to form a dynamic construction. A physical construction formed by the system of the present invention advantageously may be easily manipulated between different physical forms to show the relationship between the different forms. For example, such a mathematical relationship exists between trigonometric functions, which may be represented geometrically on a unit circle, or periodically on the Cartesian or rectangular coordinate system. See U.S Pat. No. 6,132,217, which is herein incorporated by reference.

Therefore, the system of the present invention advantageously provides students with a hands-on learning experience, and a physical embodiment of a concept (such as a mathematical concept) with which the students may experiment to encourage learning, enhance retention and comprehension, and facilitate teaching. In addition, the system of the present invention advantageously provides a physical transition between different, but related forms or concepts with a series of discrete visual positions and configurations, that allows the student to actually perceive the relationships as the dynamic construction physically transitions between the different forms or concepts, thus facilitating learning and teaching.

The construction system includes a plurality of different blocks or members which may be connected or coupled to form a construction. The term "block" or "member" is used herein to broadly refer to any block, member, body, element, etc. which are assembled together to form a construction. The plurality of different blocks includes a plurality of body members, represented in FIG. 1 by body member 14. The body members 14 may take various different forms and shapes, some of which are described below by way of example.

Figure 2:
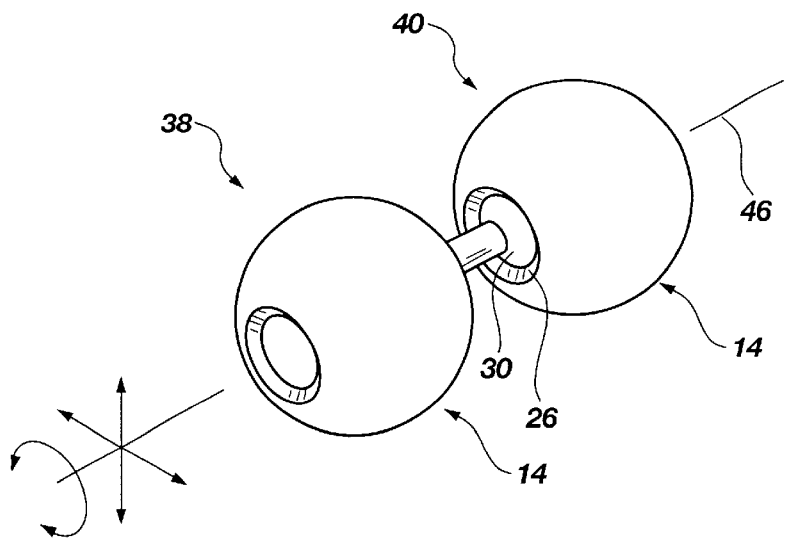
FIG. 2 is a perspective view of a preferred embodiment of a connection formed by the construction system of the present invention.
Figure 3A:
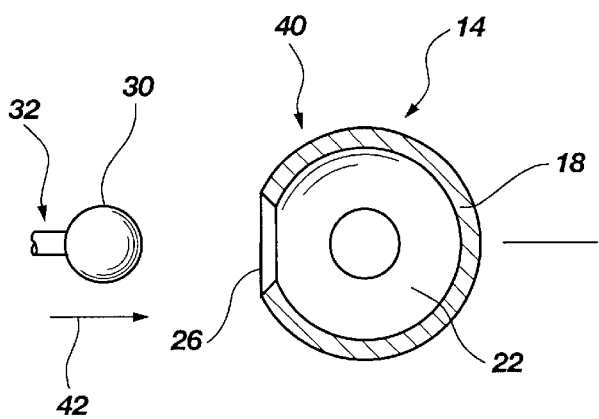
FIGS. 3a and 3b are schematic views of the connection formed by the construction system of the present invention.
Figure 3B:
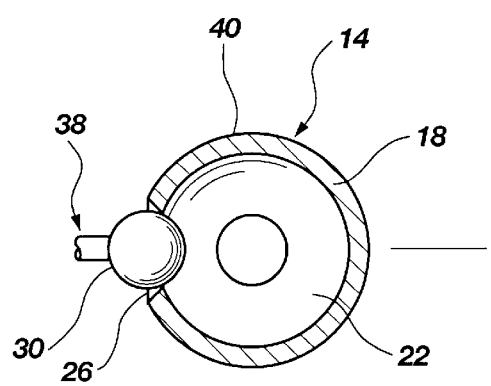

Referring to FIGS. 2, 3a and 3b, the body member 14 has a body wall 18 defining at least one interior cavity 22 within the body member 14, and defining an aperture 26 extending through the body wall 18 to the cavity 22. Thus, the body member 14 has an exterior surface, the cavity has an interior surface, and the aperture 26 extends from the exterior surface to the interior surface. The aperture 26 and cavity 22 form a socket for coupling two body members together, as discussed below.

The body member 14 further has a spherical-shaped ball 30 connected to, and spaced-apart from, the body wall 18. The ball 30 is attached to the body member 14, or body wall 18, by an arm 34 coupled to, and extending between, the body wall 18 and the ball 30. The arm 34 preferably has a length greater than a thickness of the body wall 18, as described more fully below.

The ball 30 and aperture 26 allow two body members to be releasably coupled, or detachably connected. The ball 30 preferably is sized slightly larger than the aperture 26. In addition, the ball 30 and/or body wall 18 forming the aperture 26 preferably are formed of a flexible and resilient material. Thus, the ball 30 of a first body member 38 may be inserted through the aperture 26 and into the cavity 22 of a second body member 40 under an externally applied force, represented by arrow 42. The flexible nature of the material of the body wall 18 allows the aperture 26 to expand, and/or deflect inwardly, so that the larger ball 30 may pass through the smaller aperture 26. The resilient nature of the material of the body wall 18 allows the aperture 26 to resume its original shape and size, thus holding the ball 30 within the cavity 22 by interference between the ball 30 and the aperture 22, or body wall 18 circumscribing the aperture 22. Similarly, the coupled members 38 and 40 may be detached by pulling the ball 30 back through the aperture 26. The ball 30 of one body member 38 and the aperture 26 and cavity 22 of another body member 40 may form a ball-and-socket type connection.

The aperture 26 preferably has a frusto-conical shape, or inward taper. Thus, the aperture 26 has a larger diameter on the outer surface, and a smaller diameter on the inner surface, or reduces in diameter from the outer to inner surface. The tapered or angled aperture 26 helps guide the ball 30 to and through the aperture 26. In addition, the body wall 18 circumscribing the aperture 26 is thinner, or has a reduced cross section, which facilitates forcing the ball 30 through the aperture 26. The thinner, innermost portion of the wall 18 surrounding the aperture 26 may bend or deflect inwardly as the ball 30 pushes the portion into the cavity 22. Likewise, the inner portion may deflect outwardly as the ball 30 is withdrawn from the cavity 22.

Figure 4:
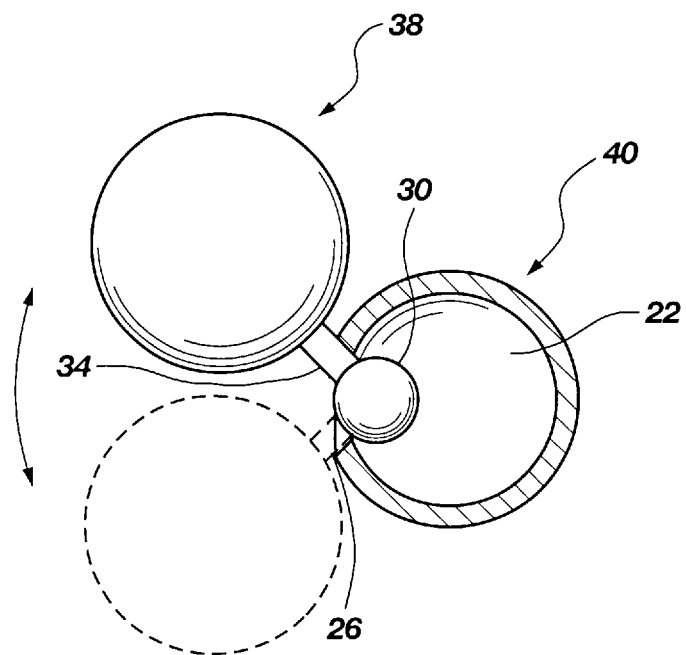
FIGS. 4 and 5 are schematic views of the connection formed by the construction system of the present invention.

In addition, the conical shape of the aperture 26 allows a dynamic connection between two members 38 and 40, or allows the coupled body members 38 and 40 to pivot with respect to one another in numerous different directions. Referring to FIG. 4, the arm 34 of the first body member 38 extends through the aperture 26 of the second body member 40, connecting the two members. As indicated above, the arm 34 preferably has a length greater than the thickness of the body wall 18. Thus, the coupled bodies 38 and 40 may be in a spaced-apart relationship when coupled, or with the ball 30 inserted into the cavity 22, because the length of the arm 34 is greater than the thickness of the wall 18, and protrudes through the aperture 26.

Because the aperture 26 is conical, or is larger at the exterior surface, the arm 34 may pivot or swivel within the aperture 26. The arm 34 can pivot or move from one side of the aperture 26, shown in solid lines, to the other, shown in dashed lines. Thus, the body members 38 and 40 may pivot with respect to one another as shown. Referring to FIG. 2, the coupled body members 38 and 40 have an infinite number of relative positions or orientations. The body members 38 and 40 may pivot with respect to one another in at least two different planes, including any plane containing a coupling axis 46. The coupling axis 46 is perpendicular to the aperture 26 and concentric with the arm 34 as it is directly inserted into the aperture 26. The coupled body members 38 and 40 may also rotate with respect to one another about the coupling, or about the ball 30 and arm 34.

Preferably, the cavity 22 is sized larger than the ball 30 such that the inner surface of the cavity 22 and ball 30 have a substantially non-contacting, or non-interfering relationship. Thus, the ball 30 may move relatively freely, or unhindered, in the cavity 22, and the body members 38 and 40 may move relatively freely. Free or uninhibited relative orientation between the coupled members 38 and 40 facilitates transition of the constructions between different forms or positions.

The body member 14, or body wall 18, is preferably spherical, or partially spherical, about the arm 34. Thus, the body wall 18 curves away from the arm 34 and ball 30. The spherical shape of the body member 14, or body wall 18, allows more space between the first and second body members 38 and 40 and a greater pivotal range of motion, as shown in FIG. 4. Alternatively, the body wall 18 about the arm may tapper away from the arm without curving.

Figure 5:
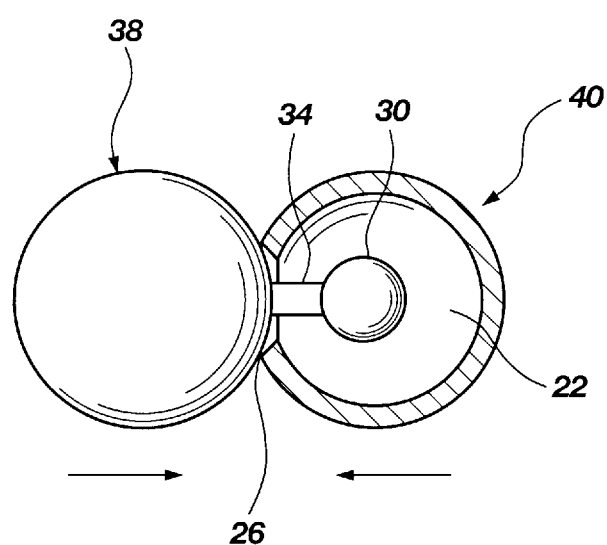

Referring to FIG. 5, the cavity 22 preferably has a depth greater than the diameter of the ball 30, and greater than or equal to the diameter of the ball 30 plus the length of the arm 34. Thus, the ball 30 and arm 34 of the first body member 38 may be inserted into the cavity 22 of the second body member 40 until the first and second body members 38 and 40 abut. When the members 38 and 40 abut they have less freedom or range of movement. Thus, the coupled body members 38 and 40 not only pivot with respect to one another, but move or displace with respect to one another. The body members 38 and 40 may move between a spaced-apart relationship where they are pivotally coupled together with a large range of movement, as shown in FIGS. 2 and 4, and an abutting position where they have a lesser range of movement, as shown in FIG. 5. Thus, the body members may be pushed together to limit their movement.

The body members 14 may have various different configurations and sizes. Thus, body members 14 may be provided in various different lengths, widths, and shapes, for forming various different constructions. In addition, the body members 14 may have various numbers and configurations of apertures 26, and numbers and configurations of balls 30, so that the body members 14 may be coupled together in numerous different ways to suit the desired construction.

Figure 6:
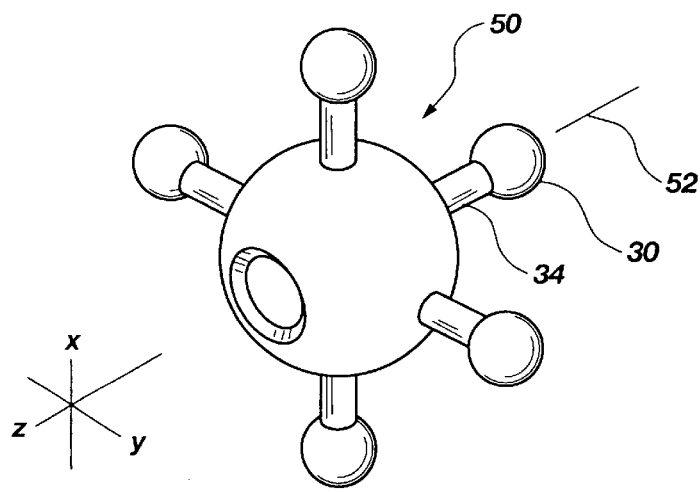
FIG. 6 is a perspective view of a preferred embodiment of a body member of the construction system of the present invention.

Referring to FIG. 6, a body member 50 may have a plurality of spaced-apart balls 30 extending from the body member 50 on arms 34 in various different directions. For example, the body member 50 may have arms 34 and balls 30 extending in three orthogonal directions, similar to the x, y and z coordinate directions, as shown. Thus, adjacent or proximal arms and balls form a ninety degree angle. The body member 50 may have an axis 52, which in this case extends along one of the arms and a single aperture 26 which are in-line with each other. Thus, one ball 30 and arm 34 extend in one direction while the single aperture 26 faces the opposite direction along the axis 52. The remaining arms 34 and balls 30 extend in a plane perpendicular to the axis 52, and in four different directions at 90 degree angles to one another. Therefore, the body member 50 may be used to couple to another body member from six different directions, including five different directions with the ball, and one direction with the aperture.

Figure 7:
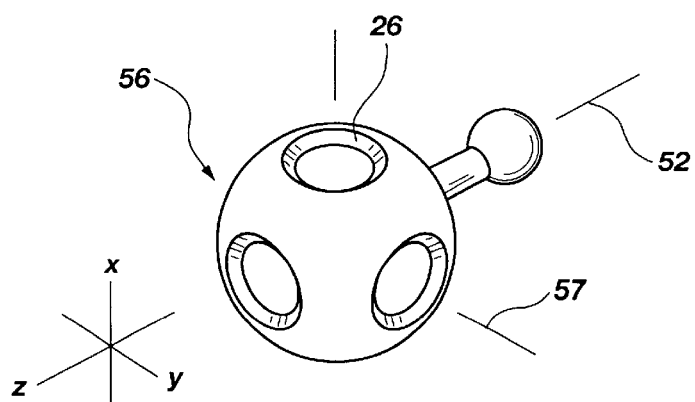
FIG. 7 is a perspective view of a preferred embodiment of a body member of the construction system of the present invention.

Referring to FIG. 7, a body member 56 may have a plurality of apertures 26 formed in the body member 56 and facing in various different directions, or aperture axes 57 with various orientations. For example, the body member 56 may have apertures 26 facing in three orthogonal directions, similar to the x, y and z coordinate directions, as shown. Thus, adjacent or proximal apertures, or their axes 57, form ninety degree angles. In addition, the body member 56 may have a single arm 34 and ball 30.

The body member 56 may have an axis 52, which in this case extends along the single arm and an aperture 26 which are in line with each other. The remaining apertures 26 face in a plane perpendicular to the axis 52, and in four different directions. Therefore, the body member 50 may be used to couple to another body member from six different directions, including five different directions with the aperture, and one direction with the ball.

Referring again to FIG. 1, the body member 14 may have a plurality of apertures 26 formed in the body member 56 and facing in various different directions, and may have a plurality of balls 30 and arms 34 extending from the body in different directions. For example, the body member 14 may have a pair of balls 30 and arms 34 extending in opposite directions along an axis 52 which extends along the arms. Similarly, a pair of apertures 26 may face in opposite directions along a different axis 60 or 62 extending perpendicularly to the apertures 26. It is of course understood that another pair of balls and arms could extend along the axis 62 replacing the apertures facing along the axis 62. Such a member 14 may be used to couple separate second and third body members which have apertures or balls. In addition, such a member 14 may be used to couple separate second and third body members on opposite sides of the first body member 14 so that the second and third body members are spaced-apart.

The body members 14, 50 and/or 56 as described above are particularly well suited for forming connections between a plurality of members and forming a point or center connection between the plurality of members. For example, one of the members 14, 50 and/or 56 may form an intersection or center-point of a plurality of members connected thereto. It is of course understood that any number and configuration of apertures 26 and balls 30 may be formed on the body member 14. For example, the apertures 26 and balls 30 may be oriented in other directions, other than the x, y, and z directions or 90 degree directions, such as forming larger relative angles therebetween, such as 120 degrees, or smaller angles, such as 60 degrees. Thus, the arms 34 may extend, and/or the apertures 26 may face, in a plane in various different directions, such as three different directions, as opposed to four.

Figure 8:
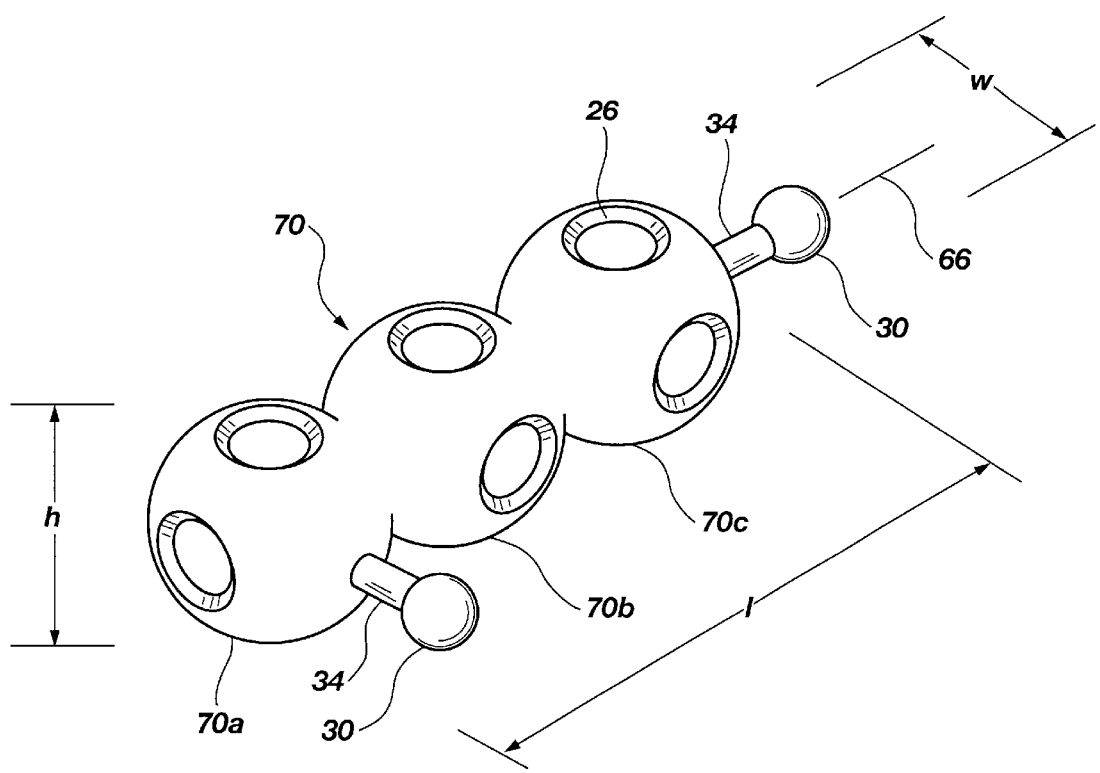
FIG. 8 is a perspective view of a preferred embodiment of a body member of the construction system of the present invention.
Figure 9:
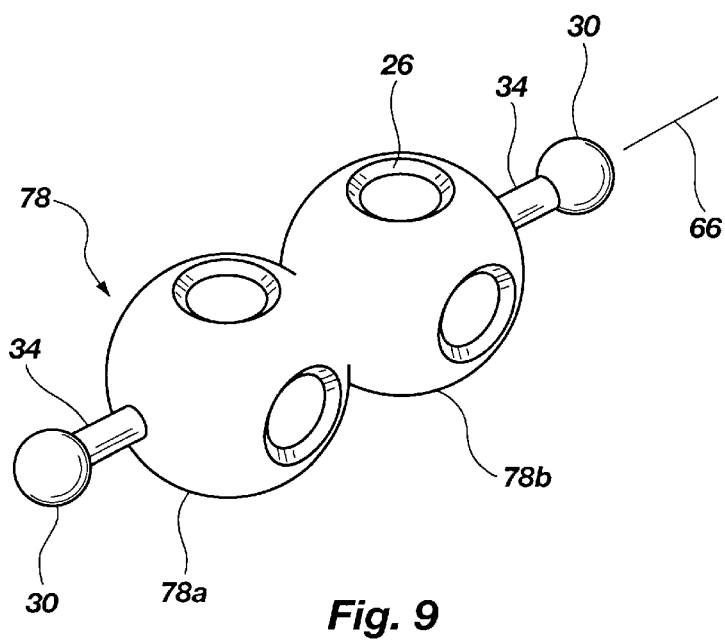
FIG. 9 is a perspective view of a preferred embodiment of a body member of the construction system of the present invention.

Referring to FIGS. 8 and 9, body members 70 and 78 may have various different lengths to form different sized constructions. The body members may be elongated, and have a length l greater than a width w and/or a thickness or height h. Such body members have an axis 66, or longitudinal axis, extending along the length of the body members. The body members may be formed of a number of distinct segments, such as spherical, or partially-spherical, segments. For example, the body member 70 may be formed of a plurality of distinct segments 70a, 70b, and 70c, rigidly connected together, or integrally formed in a linear configuration. As indicated above, the spherical segments may be formed about the arms 34 and apertures 26 so that the body wall 18 tapers away from the arms 34 and apertures to provide a greater range of pivotal movement. The distinct segments may be used to represent units, or unit lengths.

In addition to having a number of apertures 26 spaced radially about the body member as shown in FIGS. 1, 6 and 7, the body members may have a plurality of apertures 26 extending along the length of the body member. Thus, different body members may be coupled anywhere along their length. The apertures 26 may be aligned in rows along, or parallel with, the axis 66, as shown. Thus, the rows of apertures face in the same directions. As shown in FIGS. 8 and 9, connections can be made from four different directions perpendicular to the axis 66. Alternatively, adjacent apertures 26 may be twisted with respect to one another forming a helix pattern so that connections may be made from various different angles. Thus, apertures face in numerous different directions and connections can be made from numerous different angles.

Figure 19:
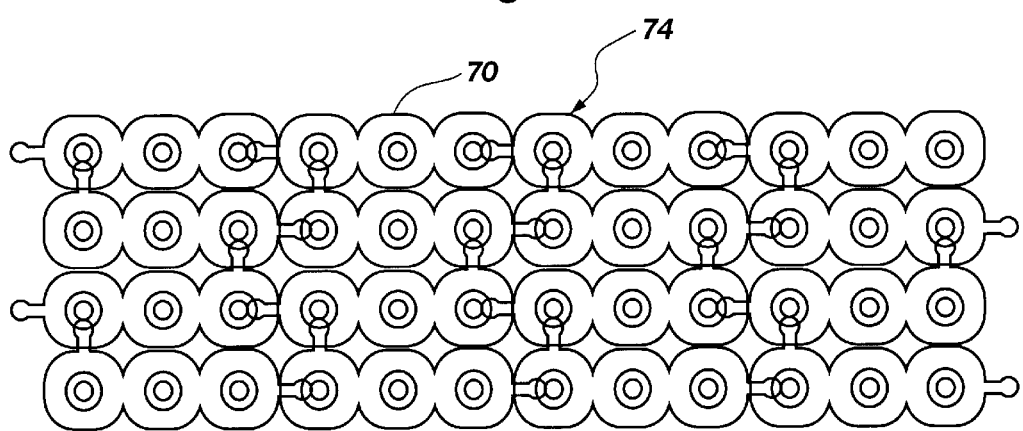
FIG. 19 is a top view of a dynamic construction formed by the construction system of the present invention.
Figure 24:
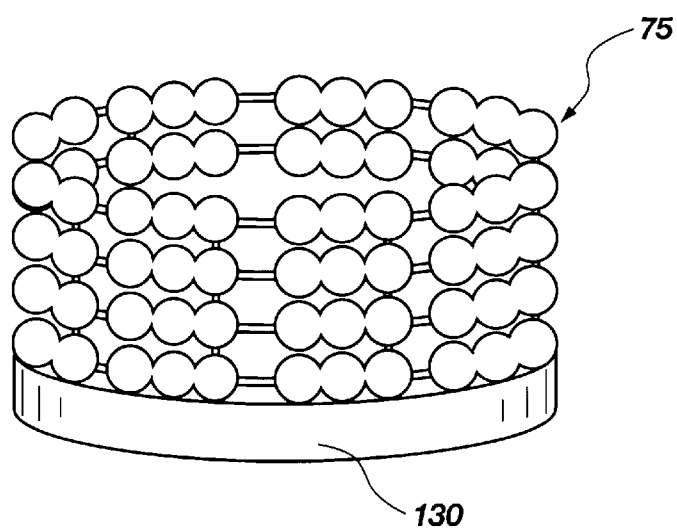
FIG. 24 is a perspective view of a dynamic construction formed by the construction system of the present invention.

Referring to FIG. 8, the elongated body member 70 may have a plurality of separate apertures 26 formed along the length of the body member 70 and axis 66, and formed radially about the body member 70 and axis 66. In addition, the body member 70 may have two or more balls 30 and arms 34 extending in transverse directions. As shown in FIG. 8, two balls extend orthogonally, with one ball 30 and arm 34 extend longitudinally along the axis 66, and another ball 30 and arm 34 extending perpendicularly to the body member 70 and axis 66. Such a body member 70 may be used to couple end-to-end to form an elongated construction, and side-to-side to form a wider construction, as discussed below. For example, such body members 70 may be coupled end-to-end and side-to-side to form a plane 74, or planar layer construction, as shown in FIG. 19. The body members 70 may be abutted as described above to limit relative movement, and may be pivoted about the couplings to manipulate the construction. Thus, dynamic couplings formed between the body members 70 allow the planar construction 74 formed by the body member 70 to be dynamic. Therefore, the planar construction 74 may be manipulated to form a different construction, such as a cylinder 75, as shown in FIG. 24, a cone, a wave, etc.

Referring to FIG. 9, an elongated body member 78 may have an opposing pair of balls 30 and arms 34 extending longitudinally in different directions along the axis 66. The body member 78 may be formed of two spherical segments 78a and 78b, as shown, or may have any number of spherical segments or lengths. Such a body member 78 is similar to the body member 14, but elongated. Thus, the body member 78 may be used to separate other body members.

As shown in the drawings and discussed above, the various body members may be formed of similarly sized and shaped, but discrete, segments. The segments may be spherical or partially spherical to maximize the range of pivotal motion between connected members as described above. In addition, the segments may be used to represent units, or unit distances, to facilitate in teaching or demonstrating particular concepts. For example, a body member formed of four segments may couple two other body members together and represent that the two other body members are separated by a distance of four units.

Referring to FIGS. 10a and 10b, the balls/arms 30/34 and apertures 26 may be oriented at various different angles with respect to one another so that different body members may be connected at different angles. Referring to FIG. 10a, first and second arms 34a and 34b may extend from the body to form an obtuse angle $\theta_1$, which may be 120°, as shown. Similarly, first and second apertures 26a and 26b may face, or have axes, oriented to form an obtuse angle 62, which may be 120°, as shown.

Alternatively, referring to FIG. 10b, first and second arms 34a and 34b may extend from the body to form an acute angle $\theta_3$, which may be 60°, as shown. Similarly, first and second apertures 26a and 26b may face, or have axes, oriented to form an acute angle $\theta_4$, which may be 60°, as shown.

Likewise, referring to FIG. 10a, an arm 34a and aperture 26a may form an acute angle $\theta_5$, which may be 60°, as shown. Alternatively, referring to FIG. 10b, the arm 34a and aperture 26a may form an obtuse angle $\theta_6$, which may be 120°, as shown.

Referring to FIG. 11, a body member 82 also may have an arm 84 and ball 85 extending from the body 86 at an angle $\theta_7$ with respect to the body 86 or longitudinal axis 52. For example, the angle $\theta_7$ may be acute, such as 60°, as shown. Thus, three body members 82 may be coupled as shown to form a triangular shape. It will be appreciated that various different angles may be utilized to obtain constructions of various different shapes or geometric configurations. For example, the arms may form an obtuse angle of 120 degrees, so that six bodies may be coupled in series to form an open polygon with six sides. In addition, several of the triangular shapes may be combined to form larger structures, which initially may be flat. It will be appreciated that the dynamic coupling of the body members 82 will allow these initially flat constructions to be manipulated or curved into curved structures such as domes.

Figure 12:
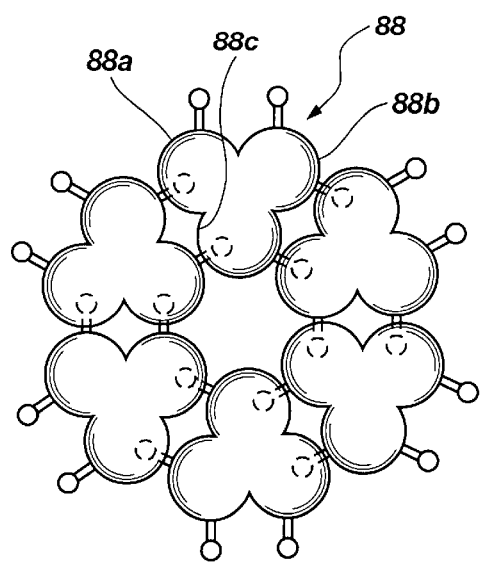
FIG. 12 is a top view of a construction formed by alternative embodiments of body members of the construction system of the present invention.

As indicated above, the body members may have various configurations, such as elongated. Referring to FIG. 12, the body members 88 may form various different shapes, such as triangular, as shown. The body member 88 may be formed of three or more distinct segments 88a, 88b, and 88c, connected or integrally formed so that each segment contacts the other two. Such a configuration allows the body members 88 to be coupled together to form a polygon construction, such as having six sides, as shown. In addition, several of the polygon constructions may be combined to form larger structures, which initially may be flat. It will be appreciated that the dynamic coupling of the body members 88 will allow these initially flat constructions to be manipulated or curved, such as into or out of the page, into curved structures such as domes.

Figure 13A:
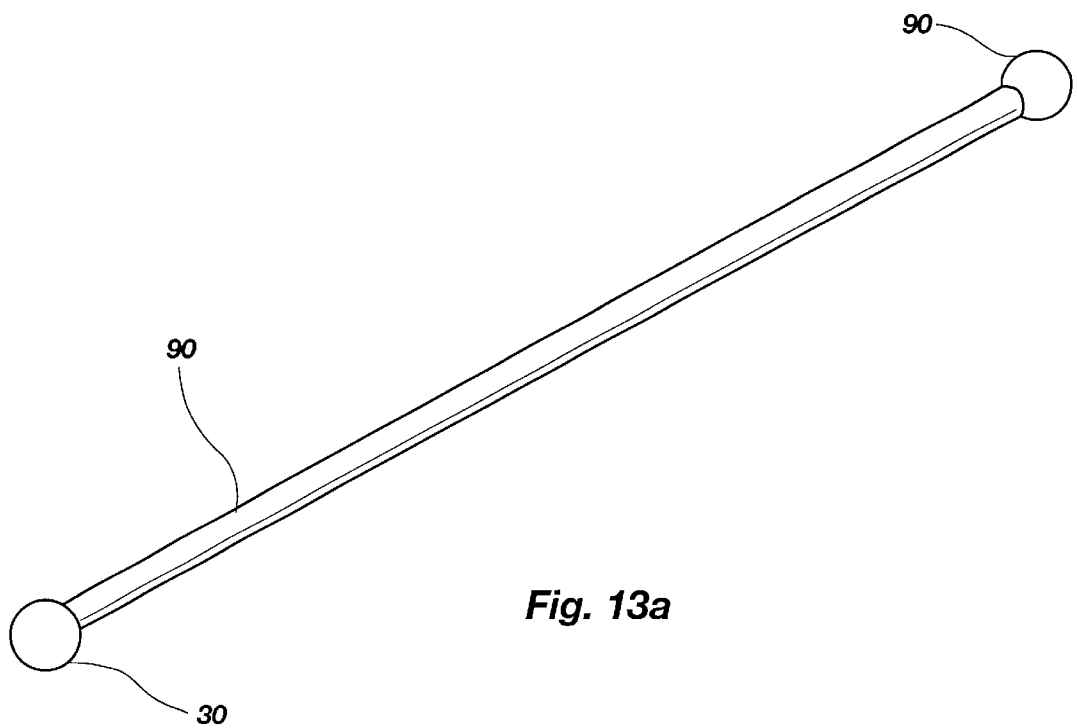
FIGS. 13a–13c are perspective views of preferred embodiments of rod members of the construction system of the present invention.
Figure 13B:
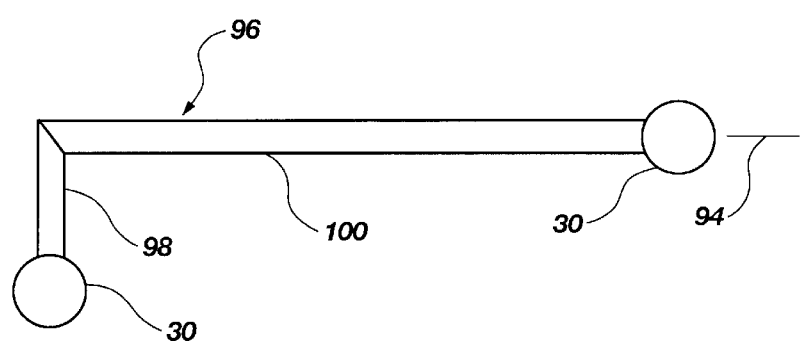
Figure 13C:
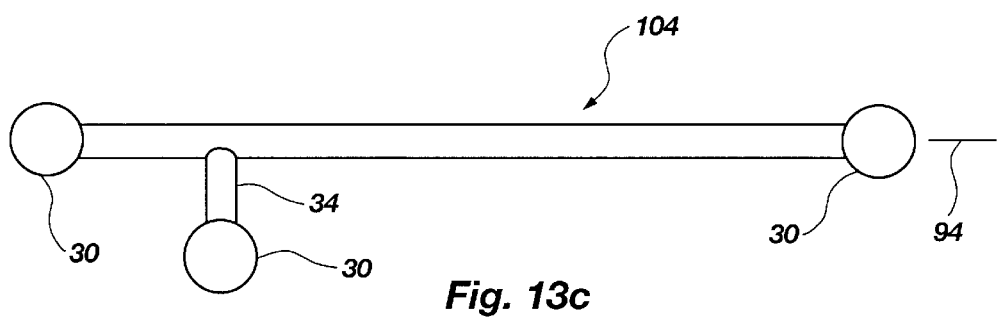
Figure 21:
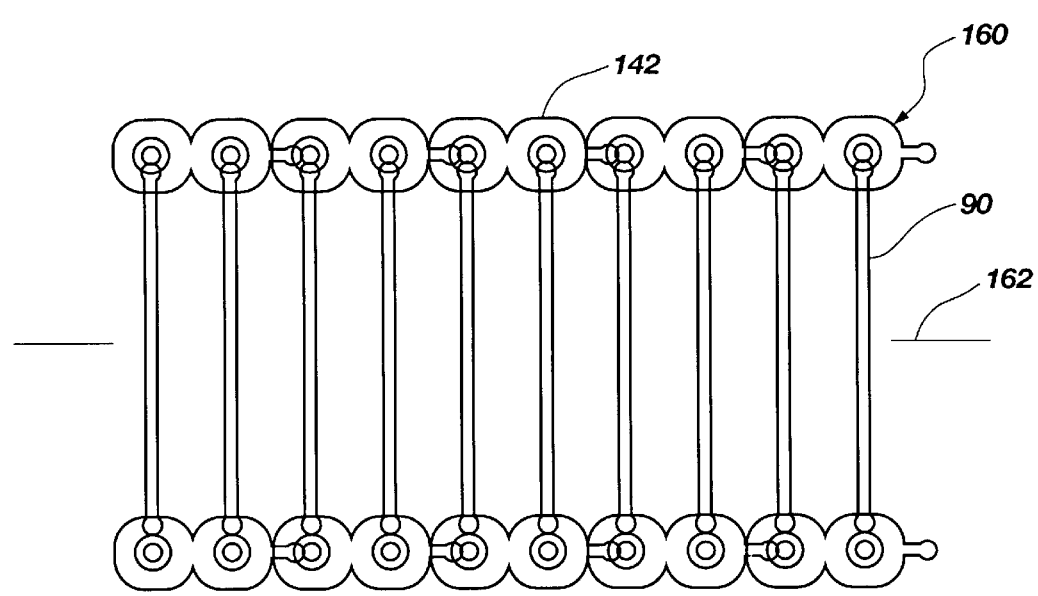
FIG. 21 is a top view of a dynamic construction formed by the construction system of the present invention.

Referring to FIGS. 13a–13c, the construction system, or different blocks or members, may include a plurality of rod members 90. The rod members 90 preferably are elongated narrow bodies. The rod members 90 have balls 30 formed on opposite ends thereof. Thus, the rod member 90 has a diameter or width similar to a diameter or width of the arms 34 described above, and the balls 30 have a greater diameter than the width of the rod member 90. As described above, the balls 30 are sized to be received in the apertures 26 of the various body members. The rod members 90 are particularly well suited for coupling body members in a spaced-apart relationship, as shown in FIG. 21. Thus, the rod members 90 may be used to form physical representations of chemical or DNA chains. The rod members 90 may be used to conceptually tie two objects together, or relate two objects together, where no real structure exist. The reduced width of the rod members 90 facilitates imagining that the rod members 90 have no substance. Thus, the rod members 90 may be used to physically represent a force, vector, relations, etc.

Referring to FIGS. 13b and 13c, rod members may be provided with balls 30 extending orthogonal or transverse to a longitudinal axis 94 extending along a length of the rod members. Referring to FIG. 13b, a rod member 96 may form an angle, such as a right angle, with a first straight segment or portion 98 forming an angle with respect to a second straight segment or portion 100. Such a rod member 96 is particularly well suited for coupling two objects or body members in a spaced-apart and angled relationship. Referring to FIG. 13c, a rod member 104 may have a ball 30 and arm 34 extending from the rod member 104 transverse to the axis 94 at a location along the length of the rod member 104 between the opposite ends.

Referring to FIG. 14, the construction system, or different. blocks or members, may include one or more disk members 110. The disk member 110 has a disk-shaped body with disk walls 112 defining a substantially annular groove 114. The annular groove 114 is formed around a perimeter of the disk-shaped body and has an opening 116 in a radially facing direction. The disk wall 112 may include a pair of opposing circular walls 118 and 120 forming the groove 114 therebetween. Like the apertures 26 and cavity 22 described above, the opening 116 is sized slightly smaller than the balls 30 of the body members or rod members 90. Thus, the balls 30 may be inserted through the opening 116 of the disk member 110 under an externally applied force. Therefore, a body member or rod member may be coupled to the disk member 110 at substantially any direction in a plane perpendicular to an axis 117. In addition, body members or rod members may extend radially from the disk member 110 or axis 117 at any radial angle. Therefore, the disk member 110 allows the construction of members which radiate from one another, or from a point.

The circular walls 118 and 120 may deflect outwardly away from the groove 114 as the balls 30 are inserted through the opening 116. The groove 114 may be sized larger than the balls 30, similar to the cavity 22 in the body members as described above, so that the ball 30 may move freely within the groove 114. Thus, the disk member 110 may be pivotally coupled to a body member or rod member. Alternatively, the groove 114 may be sized smaller, or have a width sized smaller, than the diameter of the balls 30 so that the opposing circular walls 118 and 120 hold the balls 30 from moving freely.

The disk wall 112 may have a taper or spherical curvature near the opening 116 which allows the disk member 110 and connected body member a greater range of pivotal movement. In addition, a thin, inwardly protruding lip 122 may be formed on the circular walls 118 and 120 and extending into the groove 14 or opening 116 to resist the insertion or withdrawal of balls 30 from the opening 116.

In addition, referring to FIG. 15, a generally cylindrical wall 124 may be formed in the disk body between the opposing circular walls 118 and 120. The cylindrical wall 124 forms and defines a disk cavity 126 in the disk body 110. One of the circular walls, such as circular wall 118, may form and define a disk aperture 128 extending through the wall 118 to the disk cavity 126. The disk aperture 128 formed in the disk member 110 is similar to the apertures 26 described above, and may be frusto-conically shaped or tapered. Thus, a body member or rod member may be coupled to the disk member 110 in a longitudinal direction, or perpendicular to the opening 116. Therefore, a body member or rod member may extend transversely, or orthogonally, to members radiating from the opening 116.

Referring to FIG. 16, a disk member 130 may also have a ball 30 and arm 34 extending from the disk member 130 in a radial direction, such as through the groove 114 and opening 116, or longitudinally along the axis 117.

Although the disk member 110 has been illustrated as being circular or cylindrical, it is of course understood that the disk member 110 may have other shapes, such as elliptical, polygonal, etc. The disk member 110 may form a center for a plurality of radiating members. The disk member 110 may allow more radial connections that a body member with a plurality of apertures. In addition, the disk member 110 may be used as a pivoting or spinning member.

Figure 17:
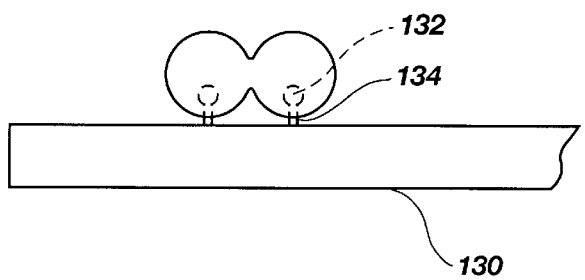
FIG. 17 is a side view of a preferred embodiment of a base member of the construction system of the present invention.
Figure 18:
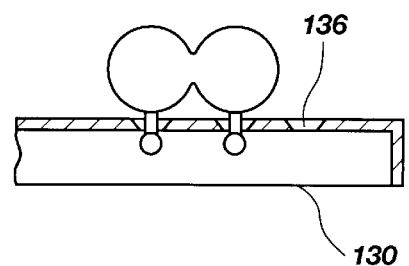
FIG. 18 is a cross-sectional side view of a preferred embodiment of a base member of the construction system of the present invention.

Referring to FIGS. 17 and 18, the construction system also may include a flat base member 130 for forming a base of a construction. The base member 130 may have a plurality of balls 132 spaced apart from the base member 130 and coupled thereto by arms 134 extending upwardly from the base member 130. Thus, the apertures of various body members may be coupled to the balls 132 of the base member 130. Similarly, the base member 130 may have a plurality of apertures 136, similar to those described above, facing upwardly. Thus, the balls of various body members may be coupled to the apertures 136 of the base member 130. The base member 130 may have various different shapes to form the shape of the construction. For example, the base member 130 may have a circular shape, to form the base of cylindrical constructions, as shown in FIG. 24.

Figure 23:
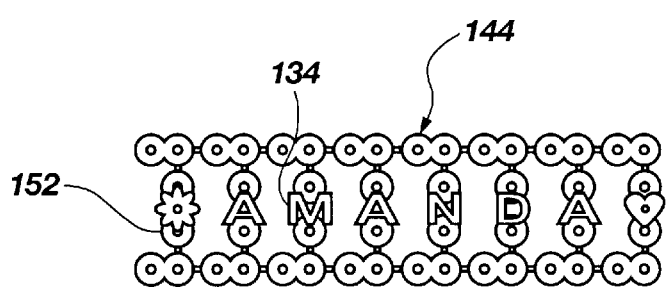

Referring to FIG. 23, the construction system also may include various decorative members 134, such as letters, flowers, shapes, flags, steering wheels, headlights, etc. The decorative members 134 may have a ball spaced from the member 134 by an arm as described above so that the decorative member 134 may be attached to constructions by inserting the ball of the member 134 into the aperture of another member.

The various blocks or members as described above, including the various body members 14, rod members 90, disk members 110, base members 130, and/or decorative members 134 may be combined in various quantities to form the construction system of the present invention. In addition, the various blocks or members, such as the body members 14, rod members 90, disk members 110, base members 130 and/or decorative members 134 may be formed in various combinations similar to those described above.

As indicated above, the blocks or members may be combined or dynamically coupled to form dynamic constructions. The dynamic constructions may be used to teach or demonstrate particular concepts, and/or the relationship between particular concepts. For example, particular body members may be coupled together in an abutting fashion to form a plane, or a planar layer construction defining a plane, as shown in FIG. 19. Because the body members are dynamically coupled, and may pivot in several (or an infinite) number of planes, the construction may be dynamically manipulated between different physical configurations without uncoupling or disconnecting any of the body members. For example, the planar constructions may be manipulated or bent from the planar configurations to various other configurations such as cylinders (as shown in FIG. 24), cones, etc., as the various body members pivot about their respective connections. Thus, the body members may be used to demonstrate the relationship between various concepts, or different physical properties, such as planes and cylinder or cones, etc.

Figure 22:
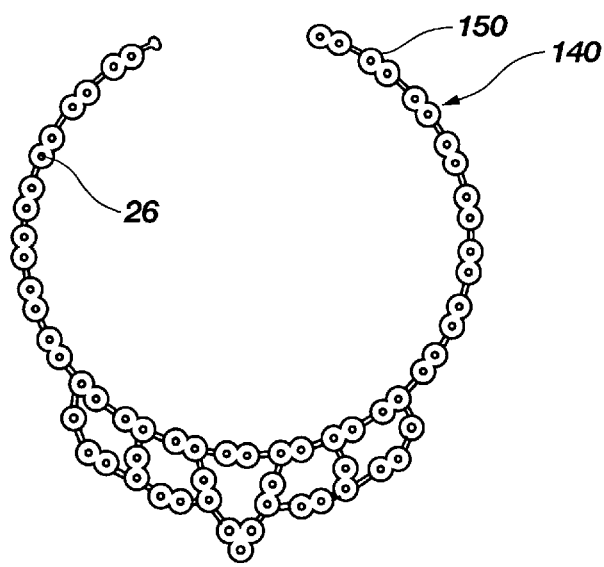
FIGS. 22 and 23 are top views of dynamic construction formed by the construction system of the present invention.

As indicated above, building constructions such as buildings, vehicles, etc. tend to appeal more to boys, and less to girls. The construction system of the present invention advantageously is designed to appeal to girls, as well as boys. The various blocks or members have preferably have curved or spherical shapes, which are believed to have more appeal to girls. In addition, the blocks or members may be combined or dynamically coupled to form constructions such as craft items. For example, the various body members may be coupled together to form a necklace 140 or a bracelet 144, as shown in FIGS. 22 and 23. Because the body members have multiple connections, more elaborate designs are available. For example, rather than forming a single linear chain, the multiple connections allow for additional members to be connected, as shown in FIG. 22.

Referring to FIG. 19, the plurality of body members 70 are formed of three aligned segments. Thus, the body members 70 are three units long and one unit wide. In addition, the body members 70 are coupled end-to-end and side-by-side to form the plane 74, or planar construction. Thus, the construction 74 may be manipulated by bending about the side-by-side connections, or the end-to-end connections. It will be apparent that the construction 74 may be manipulated into a cylinder with a smaller radius by pivoting the body members 70 about the side-to-side connections because the body members 70 are only one unit wide. Alternatively, the construction 74 may be manipulated into a cylinder 75 with a larger radius by pivoting the body members 70 about the end-to-end connections because the body members 70 are three units long, as shown in FIG. 24.

Figure 20:
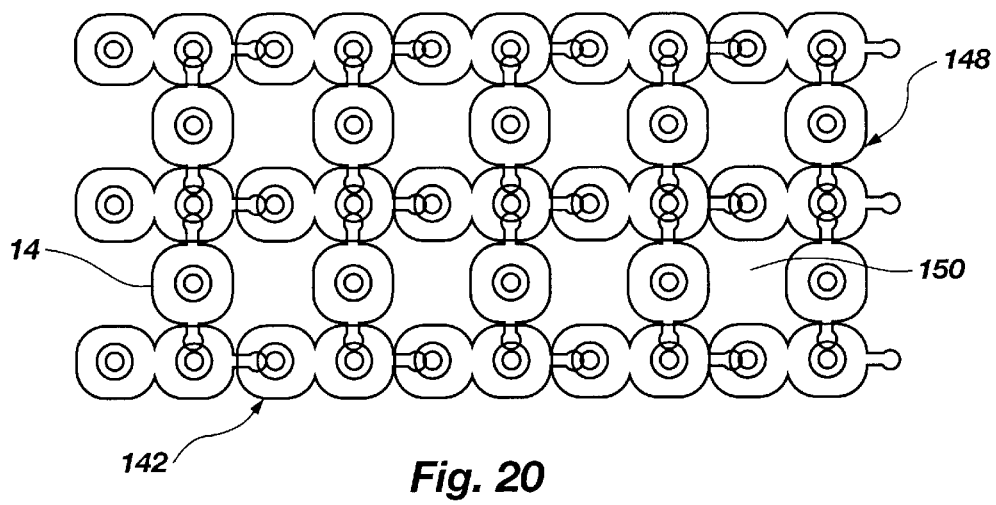
FIG. 20 is a top view of a dynamic construction formed by the construction system of the present invention.

The various body members may be coupled together to form a lattice, as shown in FIG. 20. Referring to FIG. 20, a plurality of two-segment body members 142 are coupled end-to-end in a plurality of spaced-apart groups or rows. A plurality of one-segment body members 14 are coupled to and between the rows at spaced-apart locations. Thus, the body members 14 and 142 form a lattice 148 with openings 150 therein which have a one unit size. Again, the lattice construction 148 may be manipulated between different physical configurations, such as between the planar or flat configuration, as shown, and a cylinder, cone, etc.

Referring to FIG. 21, a plurality of two segment body members 142 are coupled end-to-end in two spaced-apart groups or rows which may be configured in a parallel relationship. A plurality of rod members 90 are coupled to and between the body members 142 to form a construction 160. The rod members 90 maintain the two rows of body members 142 in a spaced-apart relationship, and at substantially consistent distances. The construction 160 may be manipulated between the flat or planar configuration, as shown, and a helical configuration by twisting the construction 160 about a longitudinal axis 162 because the body members 142 are dynamically coupled to one another, and because the body members 142 and rod members 90 are dynamically coupled together.

Referring to FIG. 22, a plurality of two-segment body members 150 are coupled end-to-end to form a continuous chain. Because the body members 150 are dynamically coupled, the chain may move dynamically. In addition, because the body members 150 have a plurality of apertures 26, additional body members may be coupled to the chain for more elaborate designs. Referring to FIG. 23, the two-segment body members 150 are again coupled end-to-end to form two parallel chains. The multiple apertures 26 allow additional body members 152 to be coupled therebetween to couple the two chains. In addition, the multiple apertures 26 also allow decorative members 134 to be coupled thereto.

As described above and illustrated in the drawings, a plurality of body members may be coupled end-to-end to form a group, row or chain which may be physically manipulated as the body members pivot about their respective connections. In addition, rod members of various lengths may have one end coupled to the chain formed by the body members. Thus, the body members and rod members may be coupled together to represent a trigonometric function or wave form with the chain of body members forming an axis (such as the horizontal axis of the Cartesian coordinate system) and the different length rod members coupled to and extending orthogonally from the chain so that the other ends define the trigonometric function or wave form, as discussed in U.S. Pat. No. 6,132,217 which is herein incorporated by reference. Thus, the above described construction may be used to demonstrate the trigonometric function on either a unit circle or Cartesian coordinate system. In addition, the construction may demonstrate a physical and a visual representation of the transformation between the unit circle and Cartesian coordinate system.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A construction system comprising:
   a plurality of body members each having a body with a body wall, at least one interior cavity, and a plurality of apertures extending through the body wall to the cavity forming a plurality of sockets, the plurality of apertures each facing in a different direction, each body member further having at least one spherical-shaped ball spaced-apart from the body wall and attached to the body wall by an arm coupled to and extending between the ball and the body wall, the body wall and ball being formed of a flexible and resilient material and the ball being sized slightly larger than the apertures such that a ball of a first body member may be inserted through one of a plurality of apertures of a second body member under an externally applied force, but such that the ball is held within the cavity by interference between the ball and the aperture, to couple the first and second body members together with the arm extending through the aperture, the plurality of sockets allowing numerous different connections between two body members.

2. The system of claim 1, wherein each aperture in the body wall of the body member has a frusto-conical inwardly tapering shape such that the body wall surrounding the aperture has a reduced thickness to facilitate insertion of the ball of the first body member through the aperture of the second body member, and such that an arm of the first body member extending through the aperture of the second body member may pivot with respect to the body wall of the second body member, thereby allowing the first and second body members to pivot with respect to one another in at least two different planes.

3. The system of claim 1, wherein the body wall of the body member forms a body with at least one segment having at least a partially spherical shape such that an area circumscribing the arm or aperture is curved away from the arm or aperture, thereby facilitating pivoting of the first and second body members.

4. The system of claim 1, wherein the arm of the body member has a length longer than a thickness of the body wall such that the ball of the first body member may be inserted in the aperture of the second body member with the arm separating the first and second body members in a spaced-apart relationship, thereby allowing the first and second body members to pivot with respect to one another.

5. The system of claim 1, wherein the cavity has a depth greater than or equal to the length of the arm such that the ball of the first body member may be inserted into a cavity of the second body member until the body wall of the first body member abuts the body wall of the second body member.

6. The system of claim 1, wherein the body member further has a plurality of spherical-shaped balls spaced-apart from the body wall and attached to the body wall by a plurality of arms coupled to and extending between the balls and the body wall.

7. The system of claim 1, wherein the arm extends from the body at an acute angle to an axis of the body such that first and second bodies are coupled at an acute angle with respect to one another.

8. The system of claim 1, wherein an aperture has an axis oriented at an acute angle to an axis of the body such that first and second bodies are coupled at an acute angle with respect to one another.

9. The system of claim 1, wherein the body is shaped into at least three distinct segments with each segment being directly attached to the other two.

10. The system of claim 1, wherein the body is elongated and has a length greater than a width or a thickness, and having a plurality of coupling means for releasably coupling body members located along the length of the body.

11. The system of claim 1, further comprising at least one different member selected from the group consisting of:
- a decorative element having a spherical-shaped ball spaced-apart from the element and attached to the element by an arm coupled to and extending between the ball and the element, such that the ball of the element may be inserted through one of the plurality of apertures of a body member to couple the element and body member;
- an elongated rod member having opposite ends and spherical-shaped balls formed on each end, the balls having a greater diameter than a width of the rod member, the balls being sized slightly larger than the aperture of the body member;
- a disk member having a disk-shaped body with disk walls and a substantially annular groove formed around a perimeter of the disk-shaped body with an opening facing in a radial direction, the opening being sized slightly smaller than the ball of the body member such that the balls may be inserted through the opening of the disk member under an externally applied force, but are held within the groove by interference between the ball and the aperture; or
- a flat base member, configured for being disposed on a support surface, and having coupling means for releasably coupling body members to the base member.

12. A construction system comprising:
- a plurality of body members each having a body with a body wall, at least one interior cavity, and at least one aperture extending through the body wall to the cavity forming a socket, each body member further having a plurality of spherical-shaped balls spaced-apart from the body wall and attached to the body wall by a plurality of arms coupled to and extending between the balls and the body wall, each of the arms extending from the body in a different direction, the body wall and balls being formed of a flexible and resilient material and the balls being sized slightly larger than the aperture such that one of the balls of a first body member may be inserted through an aperture of a second body member under an externally applied force, but such that the ball is held within the cavity by interference between the ball and the aperture, to couple the first and second body members together with the arm extending through the aperture, the plurality of arms and balls allowing numerous different connections between two body members.

13. The system of claim 12, wherein the aperture in the body wall of the body member has a frusto-conical inwardly tapering shape such that the body wall surrounding the aperture has a reduced thickness to facilitate insertion of the ball of the first body member through the aperture of the second body member, and such that an arm of the first body member extending through the aperture of the second body member may pivot with respect to the body wall of the second body member, thereby allowing the first and second body members to pivot with respect to one another in at least two different planes.

14. The system of claim 12, wherein the body wall of the body member forms a body with at least one segment having at least a partially spherical shape such that an area circumscribing the arm or aperture is curved away from the arm or aperture, thereby facilitating pivoting of the first and second body members.

15. The system of claim 12, wherein the arm of the body member has a length longer than a thickness of the body wall such that the ball of the first body member may be inserted in the aperture of the second body member with the arm separating the first and second body members in a spaced-apart relationship, thereby allowing the first and second body members to pivot with respect to one another.

16. The system of claim 12, wherein the cavity has a depth greater than or equal to the length of the arm such that the ball of the first body member may be inserted into a cavity of the second body member until the body wall of the first body member abuts the body wall of the second body member.

17. The system of claim 12, wherein the body member further has a plurality of apertures extending through the body wall to the cavity forming a plurality of sockets.

18. The system of claim 12, wherein at least one arm extends from the body at an acute angle to an axis of the body such that first and second bodies are coupled at an acute angle with respect to one another.

19. The system of claim 12, wherein the aperture has an axis oriented at an acute angle to an axis of the body such that first and second bodies are coupled at an acute angle with respect to one another.

20. The system of claim 12, wherein the body is shaped into at least three distinct segments with each segment being directly attached to the other two.

21. The system of claim 12, wherein the body is elongated and has a length greater than a width or a thickness, and having a plurality of coupling means for releasably coupling body members located along the length of the body.

22. The system of claim 12, further comprising at least one different member selected from the group consisting of:
a decorative element having a spherical-shaped ball spaced-apart from the element and attached to the element by an arm coupled to and extending between the ball and the element, such that the ball of the element may be inserted through one of the plurality of apertures of a body member to couple the element and body member;
an elongated rod member having opposite ends and spherical-shaped balls formed on each end, the balls having a greater diameter than a width of the rod member, the balls being sized slightly larger than the aperture of the body member;
a disk member having a disk-shaped body with disk walls and a substantially annular groove formed around a perimeter of the disk-shaped body with an opening facing in a radial direction, the opening being sized slightly smaller than the ball of the body member such that the balls may be inserted through the opening of the disk member under an externally applied force, but are held within the groove by interference between the ball and the aperture; or
a flat base member, configured for being disposed on a support surface, and having coupling means for releasably coupling body members to the base member.

23. A construction system comprising:
a plurality of first body members each having a body with a body wall, at least one interior cavity, and a plurality of apertures extending through the body wall to the cavity forming a plurality of sockets, the body members further having at least one spherical-shaped ball spaced-apart from the body wall and attached to the body wall by an arm coupled to and extending between the ball and the body wall; and
a plurality of different second body members each having a body with a body wall, at least one interior cavity, and at least one aperture extending through the body wall to the cavity forming a socket, the second body members further having a plurality of spherical-shaped balls spaced-apart from the body wall and attached to the body wall by a plurality of arms coupled to and extending between the balls and the body wall; and
wherein the body walls and balls are formed of a flexible and resilient material and the balls are sized slightly larger than the apertures such that balls may be inserted through the apertures under an externally applied force, but such that the balls are held within the cavities by interference between the balls and the apertures, to couple body members together with the arms extending through the apertures.

24. The system of claim 23, wherein the apertures have a frusto-conical inwardly tapering shape such that the body wall surrounding the aperture has a reduced thickness to facilitate insertion of the ball of a first body member through the aperture of a second body member, and such that an arm of the first body member extending through the aperture of the second body member may pivot with respect to the body wall of the second body member, thereby allowing the first and second body members to pivot with respect to one another in at least two different planes.

25. The system of claim 23, wherein the body walls of the body members form bodies with at least one segment having at least a partially spherical shape such that an area circumscribing the arm or aperture is curved away from the arm or aperture, thereby facilitating pivoting of coupled body members.

26. The system of claim 23, wherein an arm of the body members has a length longer than a thickness of the body wall such that the ball of a first body member may be inserted in the aperture of a second body member with the arm separating the first and second body members in a spaced-apart relationship, thereby allowing the first and second body members to pivot with respect to one another.

27. The system of claim 23, wherein the cavity has a depth greater than or equal to the length of the arm such that the ball of a first body member may be inserted into a cavity of a second body member until the body wall of the first body member abuts the body wall of the second body member.

28. The system of claim 23, wherein at least one arm extends from the body at an acute angle to the body such that first and second bodies are coupled at an acute angle with respect to one another.

29. The system of claim 23, wherein the aperture has an axis oriented at an acute angle to the body such that first and second bodies are coupled at an acute angle with respect to one another.

30. The system of claim 23, wherein at least two arms on a body member extend to form an acute angle therebetween.

31. The system of claim 23, wherein at least two arms on a body member extend to form an obtuse angle therebetween.

32. The system of claim 23, wherein at least two apertures of a body member have axes oriented to form an acute angle therebetween.

33. The system of claim 23, wherein at least two apertures of a body member have axes oriented to form an obtuse angle therebetween.

34. The system of claim 23, wherein the body is shaped into at least three distinct segments with each segment being directly attached to the other two.

35. The system of claim 23, wherein the bodies are elongated and have lengths greater than a width or a thickness, and having a plurality of coupling means for releasably coupling body members located along the length of the bodies.

36. The system of claim 23, further comprising at least one different member selected from the group consisting of:
a decorative element having a spherical-shaped ball spaced-apart from the element and attached to the element by an arm coupled to and extending between the ball and the element, such that the ball of the element may be inserted through one of the plurality of apertures of a body member to couple the element and body member;
an elongated rod member having opposite ends and spherical-shaped balls formed on each end, the balls having a greater diameter than a width of the rod member, the balls being sized slightly larger than the aperture of the body member;
a disk member having a disk-shaped body with disk walls and a substantially annular groove formed around a perimeter of the disk-shaped body with an opening facing in a radial direction, the opening being sized slightly smaller than the ball of the body member such that the balls may be inserted through the opening of the disk member under an externally applied force, but are held within the groove by interference between the ball and the aperture; or a flat base member, configured for being disposed on a support surface, and having coupling means for releasably coupling body members to the base member.

37. The system of claim 36, wherein the rod member has a longitudinal axis and at least one spherical-shaped ball spaced-apart radially from the rod member and the longitudinal axis and attached to the rod member by an arm coupled to and extending between the ball and the rod member, the arm extending transverse to the longitudinal axis.

38. The system of claim 36, wherein the disk member further has at least one spherical-shaped ball spaced-apart from the disk walls and attached to the disk walls by an arm coupled to and extending between the ball and the disk walls.

* * * * *